Dec. 31, 1957 G. C. HOOD ET AL 2,818,372
EVAPORATING HYDROGEN PEROXIDE
Filed Sept. 6, 1955
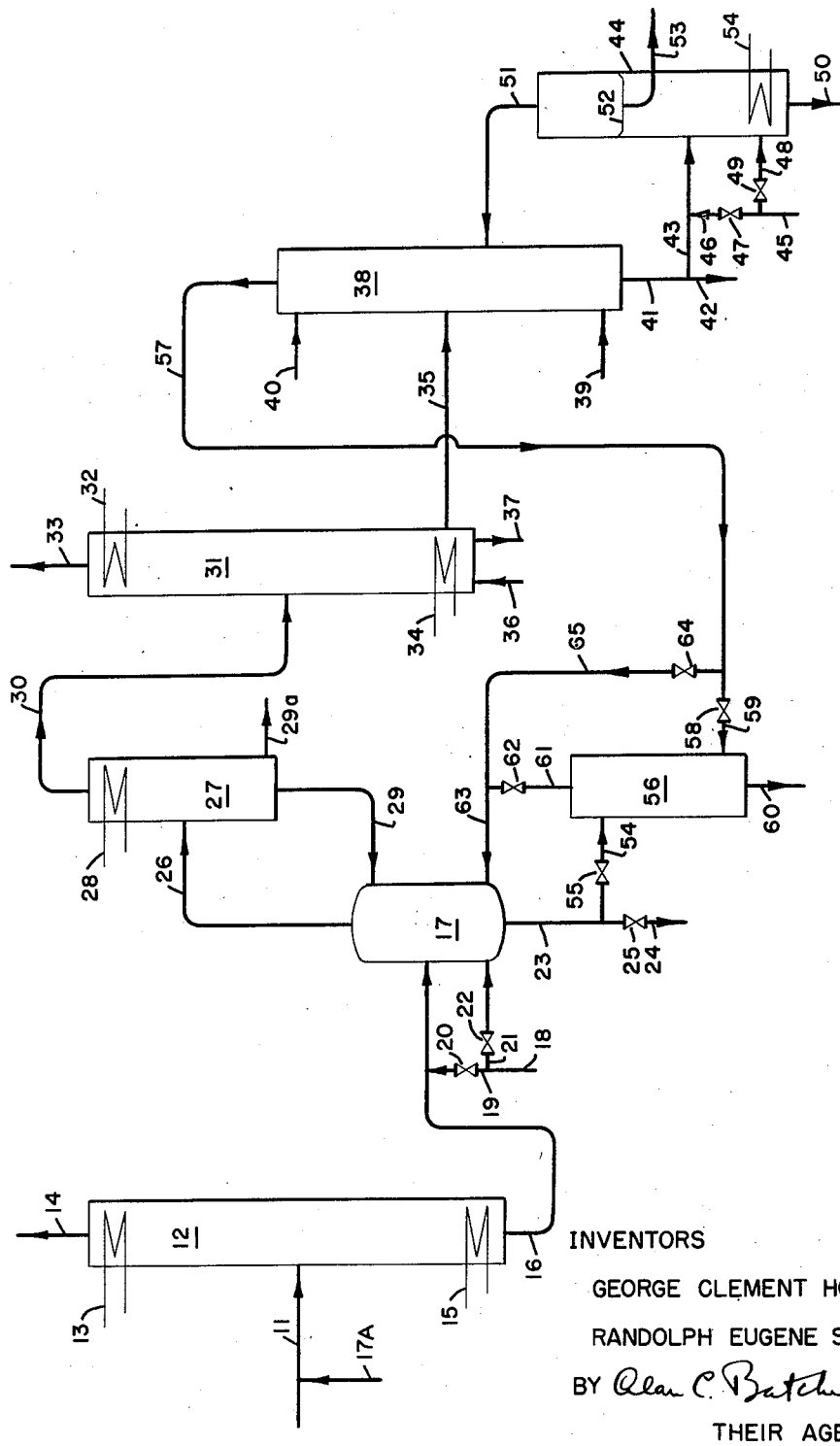
INVENTORS
GEORGE CLEMENT HOOD
RANDOLPH EUGENE SMITH
BY Alan C. Batchelder
THEIR AGENT ited States Patent Office 2,818,372
Patented Dec. 31, 1957

2,818,372

EVAPORATING HYDROGEN PEROXIDE

George Clement Hood, Orinda, Calif., and Randolph Eugene Smith, Anacortes, Wash., assignors to Shell Development Company, New York, N. Y., a corporation of Delaware Application September 6, 1955, Serial No. 532,415

5 Claims. (Cl. 202—57)

This invention relates to a process for evaporating hydrogen peroxide from an aqueous solution thereof. More particularly, the invention relates to a method of purifying hydrogen peroxide by evaporation from an aqueous mixture containing relatively non-volatile impurities and a substantial concentration of an acid of phosphorus. In a still more specific aspect, the present invention relates to a process for purifying hydrogen peroxide initially present in an aqueous solution comprising lower aliphatic alcohol, lower aliphatic carbonyl compound corresponding to the alcohol, and organic impurities such as lower molecular weight oxygenated compounds including peroxides and other labile organics.

Since water is relatively more volatile than hydrogen peroxide, hydrogen peroxide can be removed from an aqueous solution comprising relatively non-volatile impurities only by evaporating relatively large amounts of water along with the hydrogen peroxide. In the presence of a substantial concentration of an acid of phosphorus according to the present invention, this problem is greatly simplified since hydrogen peroxide may be evaporated from aqueous solution with only one fourth the amount of water previously required to be removed, thus effecting substantial savings in the amount of heat which must be supplied.

Two types of objectionable relatively non-volatile dissolved impurities may be found associated with hydrogen peroxide. Inorganic impurities, mainly metal ions such as copper and iron, are objectionable because they catalyze the decomposition of hydrogen peroxide. It has long been recognized that phosphoric acid and the alkali metal salts of phosphoric acid may stabilize aqueous solutions of hydrogen peroxide against decomposition catalyzed by such impurities. In the stabilization of such solutions, the phosphoric acid or its alkali metal salt may be employed in concentrations of 0.1 to 2 or 3 grams per liter.

The organic type of impurities is most frequently found in crude hydrogen peroxide produced by oxidation of organic compounds. Such impurities may present a considerable safety hazard in case of any failure of instrumentation or process equipment which would permit the build-up of such impurities to dangerously high concentrations subject to explosion. In processes in which organic impurities may be present together with hydrogen peroxide it is necessary to include expensive process instrumentation to guard against occurrence of undesirably high concentrations of organic impurities, and to include safety barricades to guard against the effects of possible explosion.

In the purification of hydrogen peroxide initially present in aqueous mixture with reactvie organic materials, a number of problems are caused by the tendency of peroxide to oxidize or otherwise react with such organic materials. Formation of difficultly separable complexes of hydrogen peroxide and oxygenated organic materials, or of organic peroxides, constitutes one of the problems. The danger of violent decomposition which is associated with the co-presence of hydrogen peroxide and reactive organic materials presents another and a serious problem. There is also the likelihood of excessive losses of hydrogen peroxide (assuming that explosive decomposition can be avoided) caused by slow oxidation of the organics by hydrogen peroxide. On top of all this are the difficulties that are encountered when the organic impurities themselves are unstable, or labile; this difficulty is one of particular moment since the methods heretofore known in the art for recovery and purification of hydrogen peroxide are not well suited to its clean separation from labile organic materials which themselves undergo chemical change during the course of the separation.

A process of purifying hydrogen peroxide initially present in aqueous mixture with reactive organic materials by employing such steps as fractionation, evaporation and steam-stripping requires careful design to avoid the hazards of violent decomposition mentioned above. It is customary to employ special safety measures wherever there is a chance, e. g. by malfunctioning of instruments or equipment, of building up a dangerous concentration of organic impurities in the presence of a high concentration of hydrogen peroxide. Such safety measures add substantially to the cost of a commercial installation.

According to the present invention, the need for safety measures at steps in the process where hydrogen peroxide is evaporated from an aqueous solution containing potentially high concentrations of organic impurities may be obviated by carrying out the evaporation in the presence of a substantial concentration of an acid of phosphorus.

Accordingly, it is an object of the present invention to purify aqueous hydrogen peroxide solution containing as impurities oxygenated organic compounds, including peroxidic materials, of relatively low volatility by evaporating hydrogen peroxide from the solution in the presence of a substantial concentration of an acid of phosphorus.

Another object of the invention is an economical method of carrying out the evaporation of hydrogen peroxide from aqueous solutions thereof with greater economy by applying heat to an aqueous solution of hydrogen peroxide containing a substantial concentration of an acid of phosphorus.

Other objects of the present invention will appear in the following description thereof.

In accordance with the present invention it has now been found that acids of phosphorus are uniquely effective, when present in substantial amount in aqueous solutions of hydrogen peroxide which are to be evaporated, both in promoting the evaporation of hydrogen peroxide relative to water and, where organic impurities are present, in protecting against the hazard of explosion.

Acids of phosphorus, and specifically ortho-phosphoric acid, have the unique and desirable properties of not being volatile at the contemplated conditions, not being subject to oxidation or to chemical reaction with hydrogen peroxide, and not acting as catalysts for the decomposition of hydrogen peroxide. When relatively nonvolatile organic impurities are present, phosphoric acid does not cause an increase in their volatility relative to hydrogen peroxide.

It was found that sulfuric acid, which may also a priori appear to be suitable for use according to the present invention, has the dangerous property of forming spontaneously explosive mixtures with hydrogen peroxide, water and organic impurities, and furthermore, causing mixtures of hydrogen peroxide, water and organic impurities which are not subject to detonation in the absence of sulfuric acid to be subject to detonation in the presence thereof.

In its simplest modification, the process of the present invention comprises evaporating hydrogen peroxide from an aqueous solution thereof, which may contain relatively non-volatile impurities, by admixing with said solution a substantial portion of an acid of phosphorus and maintaining the resulting mixture at an elevated temperature in an evaporation zone. Purified aqueous hydrogen peroxide product may be recovered from the vapors removed from the evaporation zone. According to the invention, the mixture maintained in the evaporation zone preferably contains at least about 30% wt. of phosphoric acid.

The process of the invention may be further described with reference to the single drawing which forms a part of the present specification and which schematically shows equipment adapted for the practice of several modes of the present invention when organic impurities are present with hydrogen peroxide.

Turning now to the drawing, it shows a schematic flow diagram of a suitable sequence of operations. An aqueous mixture comprising hydrogen peroxide, lower aliphatic alcohol, particularly isopropyl alcohol, corresponding carbonyl compound, e. g. acetone when the alcohol is isopropyl alcohol, and other oxygenated organic compounds, is introduced into the purification system via line 11. Impurities which may be present include low molecular weight acids, alcohols, esters, aldehydes and ketones, organic peroxides and labile complexes of hydrogen peroxide with such oxygenated organic compounds. Inorganic compounds, such as salts, e. g. phosphates if a phosphate stabilizer has been included, may be present, generally in concentrations well below 1% by weight. This solution may contain from about 5% to about 20%, more typically from about 5% to about 12% hydrogen peroxide by weight, the balance being the organic materials in major amount and water in minor amount. The crude feed is introduced via line 11 into fractionating column 12, which is equipped with reflux inducing means 13, overhead line 14, reboiler or internally located coils 15 and bottoms product line 16. Reflux inducing means 13 may be an internal partial condenser or may represent an external reflux system comprising a condenser and suitable piping. In lieu of reboiler or heating coils 15, the lower end of column 12 may be heated by open steam. Inlet line 17a may be provided for introduction of diluent water. Column 12 may be a fractionating column of conventional design, such as a bubble-plate, grid-tray, packed or other suitable column constructed of materials such as porcelain, aluminum or stainless steel which are compatible with hydrogen peroxide solutions. Column 12 is designed according to known methods for separation of the aqueous azeotrope of the alcohol overhead from water, with the additional feature that the tray capacity together with the reboiler capacity are sufficient to give a residence time of the liquid below the feed plate between about 5 minutes and about 100 minutes, preferably between about 10 minutes and about 30 minutes. In column 12 the crude feed is fractionated at a maximum temperature (i. e. reboiler temperature) of at least about 85° C., preferably between about 90° C. and about 120° C., and most desirably between about 90° C. and about 105° C. The pressure measured at the top of the column may be varied within limits according to the desired reboiler temperature and may be maintained within the range, for example, from about 400 to about 700 mm. Hg. There is taken overhead from column 12 via line 14 a mixture of the secondary alcohol-water azeotrope and the ketone, together with a part of the organic impurities, e. g. esters, acids and other carbonylic compounds. An aqueous solution of hydrogen peroxide is withdrawn as bottoms product from the column via line 16. The bottoms product preferably should contain between about 5% and about 35% by weight hydrogen peroxide, most desirably between about 20% and about 35% by weight. If the initial feed contains insufficient water for this, the readily calculated necessary amount of diluent water may be added via line 17a.

Loosely bound complexes and other labile organic peroxide materials are largely but not wholly decomposed in column 12. Typical liquid bottoms product from column 12 will contain about 2% to about 10% of organic materials based upon the weight of hydrogen peroxide in the product, which organic materials will include acids, esters, carbonylic compounds, alcohols and peroxidic materials of varying degrees of stability.

Liquid bottoms product from column 12 is conveyed via line 16 to evaporator 17. Evaporator 17 may be equipped with lines and pumps, not shown, to continuously circulate liquid out of and back to it in order to insure the desired low residence time in the evaporator. Evaporator 17 may be an evaporator of known design, such as a tubular evaporator.

In one modification of the present invention, phosphoric acid may be maintained in the liquid in evaporator 17. For the purpose of adding phosphoric acid there is provided line 18 through which aqueous phosphoric acid may be introduced as required, either by addition into line 16 through line 19 controlled by valve 20 or by addition directly into the evaporator through line 21 controlled by valve 22. The phosphoric acid added through line 18 may be an aqueous solution of about 50% to about 95% concentration. The liquid maintained in evaporator 17 will contain phosphoric acid, water, hydrogen peroxide and impurities in the concentrations specified below.

When phosphoric acid is maintained in evaporator 17, the material of construction employed will be such as to be resistant both to phosphoric acid and to hydrogen peroxide, e. g. the vessel may be glass lined. If no phosphoric acid is maintained in evaporator 17, stainless steel may be a satisfactory material of construction. Evaporator 17 is operated at a reduced pressure, preferably at a pressure between about 100 and about 250 mm. Hg. The feed rates to the evaporator system and the rate of withdrawal of the liquid residue (via line 23) may be adjusted to yield a liquid evaporation residue containing between about 50% and about 65% by weight hydrogen peroxide, or, more broadly, between about 40% and 65% by weight. When phosphoric acid is present in evaporator 17 in the specified concentrations, the liquid residue may be reduced to an even lower concentration of hydrogen peroxide and may be withdrawn from the system altogether via line 24 controlled by valve 25. Phosphoric acid present in this liquid may be recovered for re-use.

Presence of phosphoric acid in evaporator 17 will materially reduce the potential hazard of building up an explosive mixture of hydrogen peroxide and organic impurities in the evaporator. Long periods of maloperation may be tolerated without building up concentrations of organic impurities relative to hydrogen peroxide to a hazardous level.

The vapors evolved in evaporator 17 are passed through line 26 to a short fractionating column 27 which we may term a knock-back column, wherein they are partially condensed by the cooling action of water circulated through internal condenser 28 or by water directly injected into the top of the column, and the condensate returned to evaporator 17 by line 29. The vapors entering column 27 by line 26 comprise a vaporous mixture of water and hydrogen peroxide, and may contain volatilized organic impurities having relatively low volatilities. By partially condensing these vapors with rectification, the organic impurities can be successfully knocked back into the condensate and thereby substantially excluded from the vapors of hydrogen peroxide and water which are conveyed to the subsequent concentration column 31 via line 30. Furthermore, by insertion of the short rectification column 27, possible entrainment of impurities in the vapors entering column 31 is minimized and the efficiency of rejection of relatively non-volatile organic impurities with the evaporation residue withdrawn via line 23 is materially enhanced. Column 27 may be designed with a de-entrainment section located in the lower end thereof, just above the feed port, or a separate de-entrainment unit may be interposed in line 26. Knock-back column 27 may be a grid-tray, bubble-plate, packed or equivalent column. It should have a capacity of from about 2 to 7 theoretical plates in order to obtain the desired concentration of and rejection of organic impurities into the liquid residue from the evaporation step, and should be operated at a reflux ratio (reflux/feed, weight basis) of from about 0.05 to about 0.20.

A take-off line 29a may be provided for removing liquid from the bottom tray of knock-back column 27. This may be used when the buildup of organic peroxides on that plate becomes undesirably high. The small amount of material withdrawn in this manner may be discarded or returned to evaporator 17.

Vapors leaving the top of column 27 are conveyed through line 30 into fractionating column 31 which may be provided with internal reflux condenser 32, overhead line 33, reboiler or heating coils 34 and bottoms product drawoff line 35. Column 31 may be a fractionating column designed from known principles for rectifying and concentration of vaporous mixtures of water and hydrogen peroxide, water being taken overhead and concentrated hydrogen peroxide solution being withdrawn as bottoms product. Column 31 is operated at pressures generally corresponding to those in the evaporator system, taking into account slight pressure drops through the connecting conduits, etc. For example, with vacuum being applied by vacuum pumps (not shown) or barometric condensers (not shown) on line 33, column 31 may be operated at a pressure, measured at the top, of 100 mm. Hg, and a pressure, measured at the bottom, of 130 mm. Hg. Column 27 may be operated at a minimum pressure of 160 mm. Hg, and evaporator 17 may be at a pressure of about 170 mm. Hg.

In one modification of the process, a substantial concentration of phosphoric acid is maintained in the bottoms liquid in column 31. In this case, phosphoric acid may be added through line 36 as required. A small concentration of bottoms liquid is withdrawn periodically or continuously through line 37. The major amount of bottoms product is withdrawn from a tray above the bottom of the tower itself, through line 35.

The hydrogen peroxide solution withdrawn from column 31 through line 35 may contain from about 30% to about 60% by weight hydrogen peroxide. It is conveyed via line 35 to an upper portion of stripping column 38 where it is contacted countercurrently with steam introduced through inlet 39 in the bottom of the column and wherein the strippage is subjected to the reflux action of water introduced through inlet 40. The amount of steam introduced through inlet 39 may be from about 30% to 300%, preferably from about 50% to 100% by weight of the liquid feed from line 35, depending on the concentration of the liquid feed, the concentration of organic impurities therein, and the desired concentration of hydrogen peroxide in the liquid effluent from the column. The amount of reflux water introduced through line 40 need be but a minor amount compared to the amount of feed and may be varied suitably within the range of from about 15% to about 50% by weight of the liquid feed, depending, i. e., on the desired concentration of hydrogen peroxide in the liquid bottoms product from column 38. Column 38 may be a grid-tray, bubble-plate, or other column of conventional design, constructed of materials which are compatible with hydrogen peroxide. It is preferably operated at between about 350 and about 700 mm. Hg pressure.

Liquid bottoms product is withdrawn from column 38 via line 41 and may be withdrawn from the system via line 42, either for further concentration or for ultimate use, or it may be passed via line 43 to column 44 for a simple further purification step. If column 44 is to be employed it is preferred to maintain in the liquid in the bottom thereof a substantial concentration of phosphoric acid, according to the present invention. The acid may be added through line 45 as required and may be either introduced into line 43 through line 46 controlled by valve 47 or into the column itself through line 48 controlled by valve 49. Column 44 is equipped with reboiler or heating coil 54, bottoms outlet line 50, overhead line 51, catch-tray 52 and product drawoff 53, which removes product from the catch-tray. The purpose of column 44 is to provide an additional purification step in which aqueous hydrogen peroxide is further separated from relatively non-volatile impurities which may still be contained therein. The concentration of hydrogen peroxide on catch-tray 52 may be in the range from 30% to 60% $H_2O_2$, depending on the operation of the system. Vapors relatively rich in water are returned to column 38 via line 51. The use of phosphoric acid according to the present invention is particularly advantageous in a column such as column 44 because only a very small stream, perhaps as little as 1%, need be withdrawn through line 50 for removal from the system, and further because organic impurities will be built up in a liquid containing highly concentrated hydrogen peroxide and the potential safety hazard of such an operation would require extremely expensive safety measures which are largely obviated by the present invention.

When evaporator 17 is operated in such a manner that hydrogen peroxide of commercial quality is to be withdrawn from the liquid residue, in which case no phosphoric acid is utilized therein, the liquid product may be withdrawn from line 23 through line 54, controlled by valve 55, into second stripping column 56. In that case, the overhead vapors from first stripping column 38 are conveyed through line 57 and line 58, controlled by valve 59, into the bottom of stripping column 56. Column 56 may be similar in construction to column 38 but is operated without induced reflux. It is operated preferably at a pressure between about 100 and about 350 mm. Hg. The weight ratio of liquid feed to gaseous feed introduced into column 56 is determined by the amount of recycle from evaporator 17 and also by the rate of introduction of steam into column 38 through line 39; in general, the weight ratio of liquid feed to gaseous feed to column 56 will be within the range of from about 1:10 to about 1:20. Stripped liquid product is withdrawn from column 56 via line 60 and may be discarded or treated by appropriate methods for recovering organic materials contained therein. Vapors overhead product from column 56 is recycled via line 61, controlled by valve 62, into line 63 for return to the preceding evaporator system and may be introduced directly into evaporator 17 as shown, or, less desirably, into a lower level of column 27 wherein it is at least in part condensed and refluxed to evaporator 17. Volatilized organics contained in recycle stream 57 pass upwardly through column 27 and thence line 30 to column 31 from which they are discharged through line 33.

When phosphoric acid is employed in evaporator 17 it serves to further reduce the concentration of hydrogen peroxide in the liquid and it is therefore preferred not to employ second stripping column 56 but to close valves 55, 59 and 62 and to open, instead, valve 25 in line 24 for withdrawal of liquid product from the evaporator and valve 64 in line 65 to permit the vaporous stream from line 57 to pass directly into line 63 for return to evaporator 17 or to column 27 as described.

If it is desired to further concentrate the aqueous hydrogen peroxide withdrawn from column 38 through line 41, the product may be suitably conducted through line 42 into a system comprising a second evaporator operating similar to zone 17 associated with a second knock-back column similar to column 27, a further fractionation column similar to column 31 and a further stripping column similar to column 38. The more concentrated hydrogen peroxide solution withdrawn from the bottom of this last mentioned steam stripping column may suitably be subjected to purification by evaporation from a liquid containing phosphoric acid, in accordance with the present invention, in a column operating like column 44. Hydrogen peroxide of concentrations as high as 85 to 90% may be recovered in this manner.

It will be appreciated that the specific arrangement of apparatus indicated in the drawing is subject to certain modifications without departure from the invention. For example, where separate columns have been indicated, such columns may be appropriately combined in a single shell with the necessary suitably positioned catch-trays, vapor bypasses, condensers, etc. Supplemental equipment will be necessary, such as measuring and regulating devices, heat exchangers, pumps, valves, and the like; these can be readily furnished by those skilled in the art where required. Where desirable, known stabilizers for hydrogen peroxide, such as sodium stannate, potassium pyrophosphate, 8-hydroxyquinoline, acetamide, or the like, may be introduced into the process streams at suitable points, in order to minimize any decomposition of the hydrogen peroxide during the purification thereof in and by the process of the invention. Throughout the present specification and in the claims, the pressures are given as mm. Hg, absolute.

Any acid of phosphorus which is stable in aqueous solutions with hydrogen peroxide at temperatures up to about 120° C. is suitable for use in the present invention. Orthophosphoric acid ($H_3PO_4$) is the most readily available commercial form as well as being ordinarily the most stable. It is therefore preferred for use in the present invention. Pyrophosphoric acid ($H_4P_2O_7$) is converted to ortho-phosphoric in hot aqueous solutions. Meta-phosphoric acid ($HPO_3$) is converted to ortho-phosphoric in cold aqueous solution. Hypo-phosphoric acid ($H_4P_2O_6$) also decomposes in aqueous solution, to the ortho- and meta-phosphoric acids. Ortho-phosphorous acid and hypo-phosphorous acid may be obtained in aqueous solution but these may be oxidized to the corresponding phosphoric acids in the presence of hydrogen peroxide.

The concentrations of phosphoric acid, water and hydrogen peroxide which are suitable for use in the present invention, and also the ranges which are preferred, are set out in Table I.

Table I

| Substances | Concentration Ranges (percent wt.) | |
|---|---|---|
| | Suitable | Preferred |
| Phosphoric Acid | 30–65 | 50–60 |
| Water | 2–30 | 15–30 |
| Hydrogen Peroxide | 15–50 | 20–25 |

It is obvious that, together with the organic impurities present, the total concentrations will add up to 100%. A preferred mixture from which hydrogen peroxide may be removed by evaporation, e. g. in evaporator 17, may contain, for example, 55% wt. phosphoric acid, 20% wt. water, 20% wt. hydrogen peroxide and 5% wt. relatively non-volatile impurities.

A composition from which hydrogen peroxide of about 50% concentration may be recovered, e. g. in column 44, may contain 58% wt. phosphoric acid, 20% wt. water, 30% wt. hydrogen peroxide and 2% wt. impurities. A composition from which hydrogen peroxide of about 90% wt. concentration may be recovered, e. g. in a column corresponding to column 44 in a second concentration stage, may contain 49.5% wt. phosphoric acid, 3% wt. water, 47% wt. hydrogen peroxide, and 0.5% wt. impurities. Other suitable composition will be readily apparent.

It will be seen from Table I that the composition will always contain at least 30% wt. of phosphoric acid. Hence, when a solution is to be made up, this may be done by adding to the aqueous hydrogen peroxide 30/70 parts by weight, or 43% wt., of phosphoric acid ($H_3PO_4$). Ordinarily it is added as aqueous acid.

The temperature to be employed in an evaporation of hydrogen peroxide according to the present invention preferably does not exceed 120° C. Temperatures in the range between about 85° C. and 120° C. are suitable, and those between about 90° C. and 120° C. and particularly between about 90° C. and 105° C. are preferred. Suitable pressures may range from relatively high vacuum, e. g. 100 mm. Hg or less to superatmospheric pressures, but will preferably be in the range between about 350 and about 700 mm. Hg in order to permit use of relatively low temperatures at which the decomposition of hydrogen peroxide is maintained at a minimum.

In some applications of the present invention, a controlled amount of phosphoric acid in the range stated is maintained in a body of liquid to which aqueous hydrogen peroxide solution is continuously or intermittently added and from which hydrogen peroxide and water are continuously evaporated, with or without reflux. In such a case, a very small bleed stream of liquid bottoms may be continuously or intermittently removed and discarded, with fresh makeup phosphoric acid added as required to maintain the desired concentration. In other applications larger amounts of the solution containing phosphoric acid, water and relatively non-volatile impurities, which may also contain some hydrogen peroxide, may be continuously or intermittently removed and such solution may be suitably treated to recover various components thereof. Volatile components of such a solution may be removed by steam-stripping, for example. Inorganic metal ions may be removed by use of ion exchange resins. Organic impurities may be thermally or otherwise decomposed. Finally, phosphoric acid may be recovered by removing various undesirable components remaining therein by a fractional distillation step. Rather than recover phosphoric acid by relatively involved processes such as described, it may be desirable to merely concentrate the solution by a suitable procedure, such as by simple evaporation, and employ it for a use in which high purity of phosphoric acid is not important, e. g. in the production of fertilizer.

We claim as our invention:

1. A process for evaporating hydrogen peroxide from an aqueous solution thereof which comprises admixing with said solution at least 43 weight percent of phosphoric acid and maintaining the resulting mixture at an elevated temperature in an evaporation zone.

2. The method of removing hydrogen peroxide by evaporation from a solution containing small amounts of relatively non-volatile impurities which comprises applying heat to a body of solution comprising hydrogen peroxide, said impurities, water and at least about 30% wt. phosphoric acid.

3. The method of removing hydrogen peroxide by evaporation from a solution containing small amounts of relatively non-volatile organic impurities, which comprises applying heat to a body of solution comprising said impurities, from about 30% wt. to about 65% wt. of phosphoric acid, from about 2% wt. to about 30% wt. of water, and from about 14% wt. to about 50% wt. of hydrogen peroxide.

4. In a method of separating hydrogen peroxide from a solution thereof containing lower aliphatic alcohol, lower aliphatic carbonyl compound corresponding to the alcohol and organic impurities comprising other oxygenated organic compounds than the alcohol and the carbonyl compound and including organic peroxidic materials of divergent volatilities and stabilities wherein said solution is fractionally distilled to take lower aliphatic alcohol and corresponding carbonyl compound overhead and to leave as bottoms product an aqueous solution of hydrogen peroxide comprising residual organic compounds, the improvement which comprises thereafter subjecting to evaporation a solution comprising said hydrogen peroxide, at least a portion of said residual organic compounds, water, and at least about 30% wt. of phosphoric acid, by applying heat thereto in an evaporation zone.

5. A process for purifying aqueous hydrogen peroxide solution containing lower aliphatic alcohol, lower aliphatic carbonyl compound corresponding to the alcohol and organic impurities comprising other oxygenated organic compounds than the alcohol and carbonyl compound and including organic peroxidic materials of divergent volatilities and stabilities, comprising fractionally distilling said solution in a first fractionation zone to take lower aliphatic alcohol and corresponding carbonyl compound overhead and to leave as bottoms product an aqueous solution of hydrogen peroxide comprising residual organic compounds, introducing said bottoms product into a body of solution comprising hydrogen peroxide, said residual organic compounds, water, and at least 50% wt. of phosphoric acid in an evaporation zone, and applying heat to said body of solution to boil off vapor comprising hydrogen peroxide and water.

References Cited in the file of this patent

UNITED STATES PATENTS

| | | |
|---|---|---|
| 632,096 | Bruckman | Aug. 29, 1899 |
| 2,491,732 | Hawkinson et al. | Dec. 20, 1949 |
| 2,520,870 | Wood et al. | Aug. 29, 1950 |
| 2,749,291 | Pierotti et al. | June 5, 1956 |

OTHER REFERENCES

"Hydrogen Peroxide Production Through 2-Ethyl Anthraquinone," reported by W. G. Gormley. Published by Combined Intelligence Objective Sub-Committee, April 1945. (Copy in Div. 59.)